UNITED STATES PATENT OFFICE.

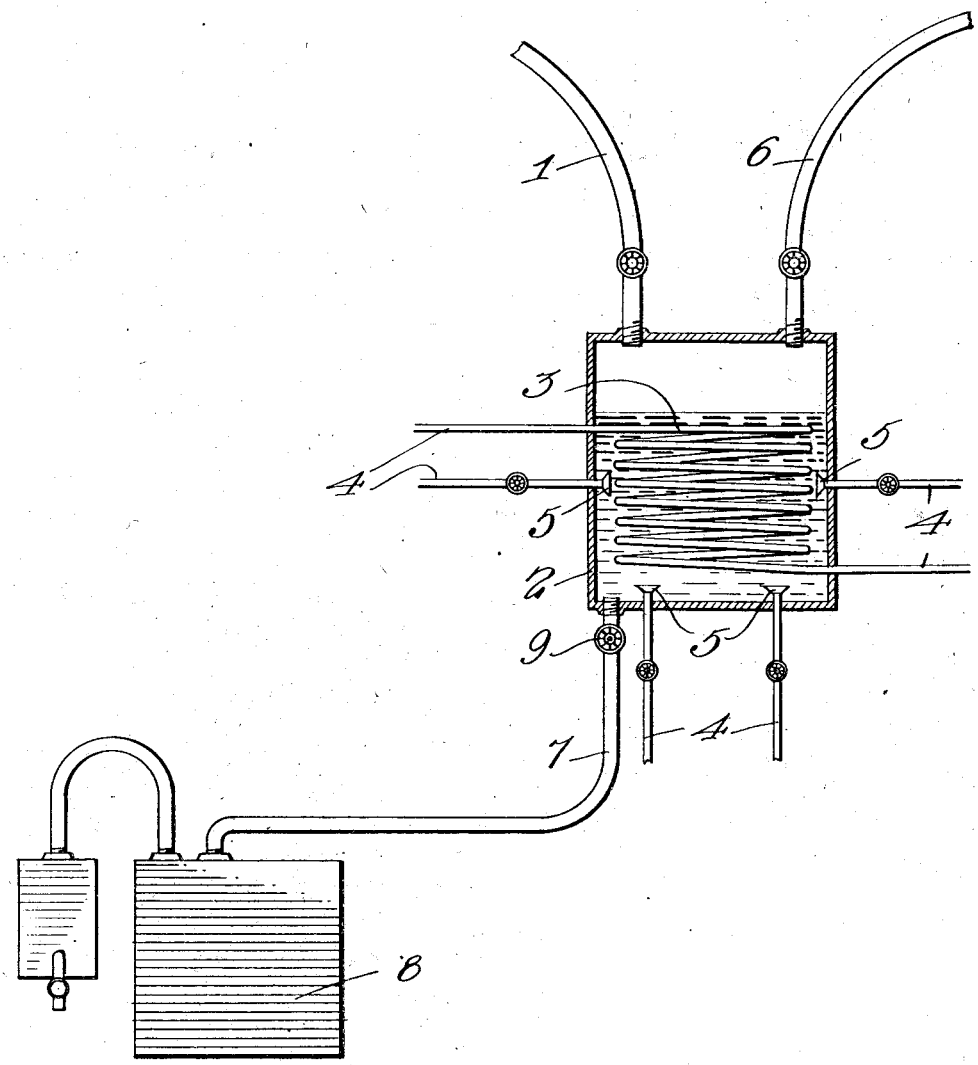

HENRI HENNEBUTTE, OF PARIS, FRANCE, ASSIGNOR TO SOCIÉTÉ ANONYME DES COMBUSTIBLES INDUSTRIELS, OF PARIS, FRANCE.

MANUFACTURE OF PURE CARBON.

1,155,419.  Specification of Letters Patent.  Patented Oct. 5, 1915.

Application filed February 21, 1914. Serial No. 820,305.

*To all whom it may concern:*

Be it known that I, HENRI HENNEBUTTE, citizen of France, residing at 25 Rue Pigalle, Paris, France, have invented certain new and useful Improvements in the Manufacture of Pure Carbon, of which the following is a specification.

This invention relates to a process for the manufacture of a material containing a certain proportion of pure carbon that can be used for any purposes, but is intended chiefly for electrical purposes, said material being obtained by using hydrocarbons such as coal tar and tar oils petroleum tar or oils and various other hydrocarbons, in fact any organic material, that is rich in carbon and contains but little ash and that either alone or mixed with other organic substances is liquid below 200° C.

The process consists in first removing any mineral dust that may be contained in the material to be treated, this removal being effected either by allowing the material to stand or by filtration. The hydrocarbon or tar oil that constitutes the raw material is then simultaneously heated and submitted to the action of a current of air or oxidizing gas supplied in a well divided condition and for a considerable length of time. This current of air or oxidizing gas is intended to dehydrogenate the hydrocarbon and produce strongly dehydrogenated substances that by subsequent carbonization will yield a substantial proportion of pure graphite-like carbon. The air will better act on the hydrocarbons when the hydrocarbons are sprayed into contact with the air, since it increases their contact with the air, or the hydrocarbons may be passed in a gaseous or vaporous state into a heated receiver and be therein treated with a current of air or oxidizing gaseous matter. In order to render the transformation of the hydrocarbon or tar oil more complete and rapid the static pressure of the mass of oil or tar under treatment can be increased. The action of the heat and that of the oxidizing gas must be stopped before carbonization of the whole mass begins to set in, *i. e.* before the material becomes coked (between 400 and 500° C.) The material or mass obtained in this manner is submitted to the action of a solvent, such as benzene, petroleum oils or tar oils, in order to separate the insoluble portion of the material consisting of strongly dehydrogenated substances from the soluble portion. The insoluble part referred to is removed by decanting or filtering the oxidized mass of oil, and is submitted to the action of heat until it is thoroughly carbonized, the pure carbon to be produced being obtained in this manner.

The carbon secured by this process is hard and resembles graphite. It is but slightly porous and may serve as a good conductor of electricity. It can advantageously be used for the manufacture of electrodes and other electric conductors.

As regards the part of the oxidized mass obtained by mixing the oils with the soluble substances of the original material, the same is distilled in order to separate off the solvent. On having thus recuperated the solvent in a known manner by distillation, the dissolved substances obtained as a residue are again submitted, either alone or mixed with a further amount of raw material, to the oxidation above referred to, until these substances are likewise transformed into a strongly dehydrogenated insoluble mass.

Reference is now to be had to the accompanying drawing illustrating by way of example, an apparatus which may be used to practise the process.

The hydrocarbon to be treated is preferably left standing or filtered or otherwise treated so as to remove mineral dust which may be present, and is then either in a liquid or gaseous state supplied through a pipe 1 to a reservoir or still 2 in which it is heated, as by means of steam passing through a pipe 3 disposed within the reservoir. The material may be heated to any degree before carbonization occurs and simultaneously with the heating, currents of air under pressure are passed through one or more pipes 4 and thence through nozzles 5 thereon so as to be discharged into the mass in the reservoir in a finally divided condition to dehydrogenate the mass. This dehydrogenated mass then has a solvent such as benzin, petroleum oils, or tar oils admitted thereto, as through a pipe 6, in order to separate the insoluble portion of the material (consisting of strongly dehydrogenated substances) from the soluble portion. The material may now be decanted as through a pipe 7 which conveys it to a still 8. A cut off valve 9 is provided in pipe 7 and is opened to permit the liquid to flow therethrough, after which it is closed. The oxidized mass of insoluble dehydrogenated hydrocarbon remaining in the still is then heated by the pipe 3 until it is thoroughly carbonized and the carbon product sought is obtained. As to the decanted material in the still 8, the same is distilled while therein and the solvent separated so that the dissolved substances obtained as a residue may be utilized as hereinbefore mentioned.

What I claim is:

1. A process for the production of carbon consisting in treating hydrocarbons while in a heated state with an oxidizing current of gaseous matter to a degree short of carbonizing the hydrocarbons, subsequently treating the hydrocarbons with a solvent in order to separate dehydrogenated insoluble substances contained in the oxidized mass, and subsequently carbonizing the insoluble mass to produce the ultimate product.

2. A process for the production of carbon consisting in treating hydrocarbons while in a heated state with a divided current of oxidizing gaseous matter, adding a solvent to the oxidized material, separating the soluble substances from the remainder of the oxidized materials, heating the said soluble remainder, treating said remainder with a current of oxidizing gas, and carbonizing the dehydrogenated insoluble substances obtained.

3. A process for the production of carbon consisting in treating hydrocarbons while in a heated state with oxidizing gaseous matter, adding a solvent thereto, to separate the insoluble substances obtained by this oxidation, separating the soluble part of the oxidized mass obtained from the insoluble substances and mixing the same with raw hydrocarbons, treating the latter mixture with a current of oxidizing gaseous matter until the mixture has been transformed into a mass containing a substantial proportion of strongly dehydrogenated insoluble substances, and carbonizing the dehydrogenated insoluble substances.

In testimony whereof I affix my signature in presence of two witnesses.

HENRI HENNEBUTTE.

Witnesses:
CHAS. P. PRESSLY,
S. MOSLEY.